(12) United States Patent
Bonner et al.

(10) Patent No.: US 11,790,434 B1
(45) Date of Patent: Oct. 17, 2023

(54) METHODS AND SYSTEMS FOR MAPPING A LOCATION OF A PRODUCT

(71) Applicant: Sunrise R&D Holdings, LLC, Cincinnati, OH (US)

(72) Inventors: Brett Bonner, Richmond, OH (US); Dion B. Perkins, Cincinnati, OH (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 474 days.

(21) Appl. No.: 16/664,486

(22) Filed: Oct. 25, 2019

Related U.S. Application Data

(60) Provisional application No. 62/750,445, filed on Oct. 25, 2018.

(51) Int. Cl.
| | | |
|---|---|---|
| *G06Q 30/0601* | (2023.01) | |
| *G06Q 10/087* | (2023.01) | |
| *G06V 10/22* | (2022.01) | |
| *G06V 20/20* | (2022.01) | |
| *G06Q 30/06* | (2023.01) | |

(52) U.S. Cl.
CPC ......... *G06Q 30/0639* (2013.01); *G06Q 10/087* (2013.01); *G06V 10/22* (2022.01); *G06V 20/20* (2022.01)

(58) Field of Classification Search
CPC ..... G06Q 30/0639; G06V 20/20; G06V 10/22; G06Q 10/087
See application file for complete search history.

(56) References Cited

U.S. PATENT DOCUMENTS

| 10,552,933 B1* | 2/2020 | Calhoon et al. ......... G06T 3/40 |
| 2014/0006229 A1* | 1/2014 | Birch et al. .......... G06Q 10/087 |
| | | 705/28 |

(Continued)

FOREIGN PATENT DOCUMENTS

| WO | 2017082637 A1* | 5/2017 | .................. A47F 11/06 |

OTHER PUBLICATIONS

K. Higa and K. Iwamoto, "Robust Estimation of Product Amount on Store Shelves from a Surveillance Camera for Improving On-Shelf Availability," 2018 IEEE International Conference on Imaging Systems and Techniques (IST), 2018, pp. 1-6, doi: 10.1109/IST.2018.8577157. (Year: 2018).*

*Primary Examiner* — Matthew E Zimmerman
*Assistant Examiner* — Latasha D Ramphal
(74) *Attorney, Agent, or Firm* — Stites & Harbison, PLLC; Terry L. Wright; Gary N. Stewart

(57) ABSTRACT

Systems and method for mapping the location of a product in a store make use of images of products on shelf modules to identify the location of a product. In one implementation, a central computer receives a first image from a camera showing a subset of electronic shelf modules in the store and an indicia displayed thereon. The indicia on a selected one of the subset associated with a particular product or product is subsequently changed. The central computer then receives a second image from the camera showing the changed indicia such that the first and second image can be compared to identify the location of the shelf module and/or product within the store. In another implementation, coordinates of a scanner within one image are utilized to outline borders corresponding to the positioning of products in another image to map the location of a product in a store.

15 Claims, 8 Drawing Sheets

(56) References Cited

U.S. PATENT DOCUMENTS

2016/0328767 A1* 11/2016 Bonner et al. ..... G06K 7/10861
2017/0285449 A1* 10/2017 Bonner et al. ......... G03B 21/10
2018/0005309 A1* 1/2018 Croy et al. ......... G06Q 30/0639

* cited by examiner

METHODS AND SYSTEMS FOR MAPPING A LOCATION OF A PRODUCT

CROSS-REFERENCE TO RELATED APPLICATIONS

The present application claims priority to U.S. Provisional Pat. Application Serial No. 62/750,445 filed on Oct. 25, 2018, the entire disclosure of which is incorporated herein by reference.

TECHNICAL FIELD

The present invention relates to systems and methods for mapping the location of a product. In particular, the present invention relate to systems and methods for mapping the location of a product that make use of images of products on shelf modules in a store to identify the location of a product.

BACKGROUND

Large retailers, including grocery stores, generally carry a multitude of different products from a variety of different suppliers. Such products are typically displayed on shelves at the point-of-purchase and can be displayed over a large area. In this regard, large retailers often make use of a planogram to provide a schematic drawing or plan for displaying merchandise in a particular store and to provide details on the placement of products in that store. In retail situations, such as in grocery stores, where there is a high volume of sales of products, however, non-compliance with such planograms can be problematic. Restocking errors and the movement of certain products within a store without updating the planogram can frequently lead to out-of-stock conditions and, consequently, missed sales opportunities as such errors and movement makes it difficult to ascertain the presence of particular products within a given store. Accordingly, systems and methods that allow for improved and/or as needed mapping of a product in a store would be both highly desirable and beneficial.

SUMMARY

The present invention relates to systems and methods for mapping the location of a product. In particular, the present invention relates to systems and methods for mapping the location of a product that make use of images of products on shelf modules in a store to identify the location of a product.

In one exemplary embodiment, a system for mapping a location of a product in a store includes a central computer, a database that stores information about products present in the store, a plurality of electronic shelf modules on which the products of the store may be positioned, and one or more cameras positioned within the store and configured to obtain images of the electronic shelf modules. The database, the electronic shelf modules, and the one or more cameras are each in communication with the central computer. In some embodiments, each camera within the system is positioned at a predetermined location in the store, and each electronic shelf module includes a display frame configured to display indicia related to and positioned adjacent to the products located on the shelf module to which the display frame corresponds. The central computer is in communication with each of the electronic shelf modules, such that the central computer can transmit instructions to change the indicia displayed on the display frame of each electronic shelf module.

In one exemplary implementation of a method for mapping a location of a product in a store, information is received from a database storing data about multiple products. In some implementations, the information received from the database includes the identity of the electronic shelf modules within the store on which each product or a particular product or group of products is positioned. To determine the location of the electronic shelf modules on which a particular product is positioned, a camera within the store obtains a first image at a first time showing a selected subset of the electronic shelf modules within the store and the indicia displayed thereon. The first image is subsequently communicated to the central computer from the camera. In some implementations, the central computer may transmit instructions to each of the electronic shelf modules within the store to display a similar indicia for each of the products within the store prior to the first image being captured.

After the first image is obtained, the central computer transmits instructions to a select one of the subset of electronic shelf modules on which a particular product or products is associated, which cause the indicia displayed on the select one of the subset of electronic shelf modules to change from that shown within the first image at the first time. In some implementations, transmitting instructions to the selected one of the subset of electronic shelf modules includes transmitting instructions to change the indicia on each electronic shelf module configured to display a particular category of products. In other implementations, transmitting instructions to the selected one of the subset of electronic shelf modules includes transmitting instructions to change the indicia on each of the electronic shelf modules configured to display a single, particular product. Following the change in indicia on the select one of the subset of electronic shelf modules, the camera obtains a second image at a second time of the subset of electronic shelf modules, which shows the changed indicia on the selected one of the subset electronic shelf modules. The central computer then compares the first image to the second image to identify the location of the selected one of the subset of electronic shelf modules and/or the product(s) based, at least in part, on the changed indicia. In some implementations, the location of the selected one of the subset of electronic shelf modules may be identified based, at least in part, on the predetermined location of the camera which captured the first and second images.

In another exemplary embodiment, a system for mapping a location of a product in a store includes a central computer, one or more shelves configured to support multiple products, one or more cameras positioned within the store and configured to obtain images of the one or more shelves, and a scanner configured to scan indicia on the one or more shelves. The cameras and scanner in the system are each in communication with the central computer. In some embodiments, each camera within the system is positioned at a predetermined location in the store, and each indicia on the shelving is related to and positioned adjacent to a respective product of the multiple products positioned on the shelving. In some embodiments, each indicia comprises a universal product code (UPC). The scanner may be a device specifically designed for scanning the indicia corresponding to products within a store or, alternatively, a general purpose device, such as a smartphone with a UPC scanning application installed thereon.

In another exemplary implementation of a method for mapping a location of a product in a store, a first image corresponding to a first time is captured by a camera within the store at a first time showing multiple products positioned on or more shelves within a store and showing indicia present on the one or more shelves. The first image further shows an individual using the scanner of the system to scan the indicia corresponding to a particular product on the one or more shelves. Scanned information generated by the scanning of the particular product is communicated from the scanner to the central computer to ascertain the identity of the scanned product. In some implementations, the position of the scanner within the first image at the first time is also determined by tracking the skeletal position of the individual in the first image. A second image is then captured by the cameras that does not include the individual, but continues to show the multiple products positioned on the one or more shelves in the store. That second image is subsequently received by the central computer and processed to outline a border around the particular product that is based on the coordinates for the scanner at the first time and corresponds to the position of the product on the one or more shelves to thereby map the location of the particular product on the one or more shelves.

DESCRIPTION OF EXEMPLARY EMBODIMENTS

The present invention includes systems and methods for mapping the location of a product. In particular, certain embodiments of the present invention relate to systems and methods for mapping the location of a product in a store that make use of images of products located on shelves in a store to identify the location of the product.

Figure 1:
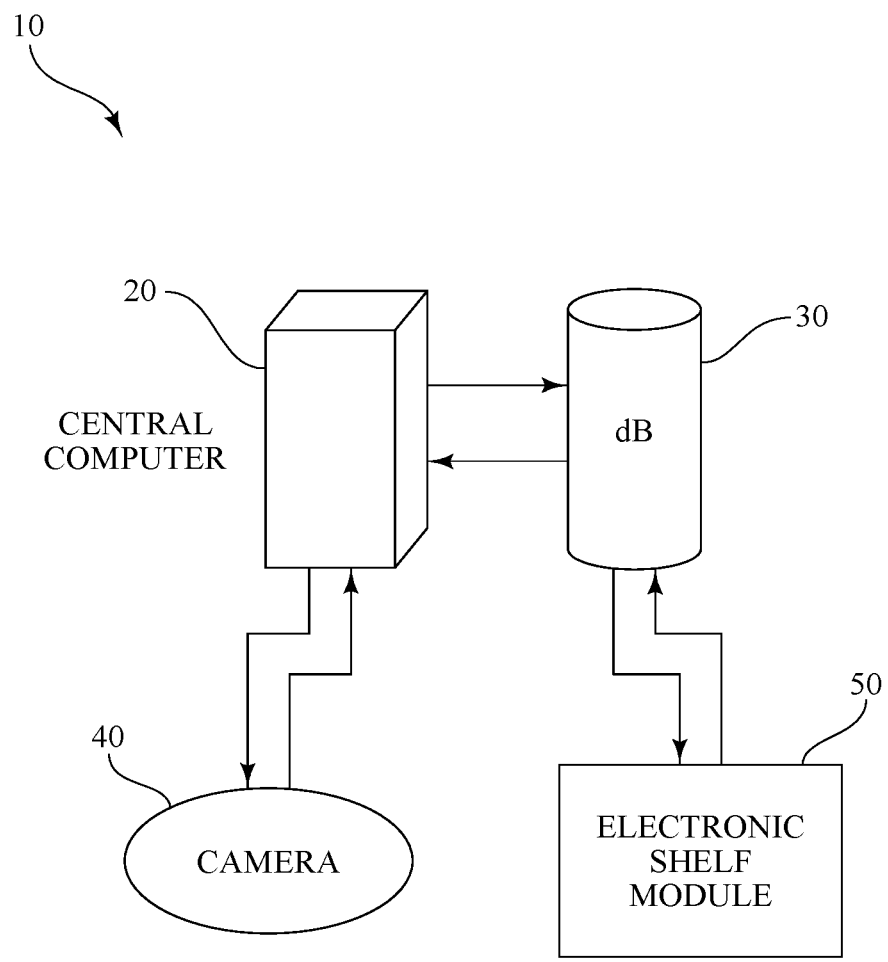
FIG. 1 is a schematic diagram showing an exemplary system for mapping the location of a product in a store in accordance with one embodiment of the present invention.

Referring first to FIG. 1, in one exemplary embodiment of a system for mapping a location of a product in a store, such as a grocery store, the system 10 comprises a central computer 20, a database 30 configured to store data about or related to the various products within the store, one or more cameras 40 configured to capture images within the field of view of the one or more cameras 40, and a plurality of electronic shelf modules 50 on which the products within the store may be positioned.

Data which may be stored within the database 30 includes, but is not limited to, data about the categories of products present in the store (e.g., boxed cereal, canned vegetables, flour, detergent, etc.), data about the general types of products present in the store (e.g., CHEERIOS® cereal, General Mills, Minneapolis, MN) or TIDE® detergent (The Proctor and Gamble Co. Cincinnati, OH), or data about the specific types of products present in the store (e.g., 15 oz. CHEERIOS® or 128 oz. Tide® with fabric softener). The database 30 is in communication with the central computer 20, such that a query of the data about the products present in the store can be initiated from the central computer 20 and sent to the database 30 from central computer 20. Information matching the query can then be received by the central computer 20 from the database 30 for further processing and analysis. In some embodiments, instructions to add, update, or otherwise modify data may also be initialized from the central computer 20 and sent to the database 30 from the central computer 20 to effectuate changes within the database 30.

In addition to being in communication with the database 30, the central computer 20 is also in communication with the one or more cameras 40, such that images captured by the one or more cameras 40 can be transmitted to the central computer 20 for subsequent processing, as further described below. The one or more cameras 40 are typically mounted in predetermined locations around the store, with each camera positioned to obtain images of at least one electronic shelf module 50 within the store. The location of each camera 40 within the store may be stored locally on the central computer 20, stored within the database 30, and/or embedded as metadata within the images captured by the cameras 40. As the system 10 may be employed in various store and shelving arrangements, the number of cameras 40 utilized within the system 10 may vary. Preferably, the number and positioning of the cameras 40 is such that images of each electronic shelf module 50, and the products 55 and indicia thereon, can be captured by at least one camera 40 within the system 10. The cameras 40 utilized in accordance with the system 10 can be any camera of sufficient resolution to provide a general image of the products and indicia present on an electronic shelf module 50 in the store, and thus are not particularly limited to any specific type of camera. For instance, in one embodiment, the cameras 40 within the system 10 may comprise surveillance cameras within the store.

Figure 2:
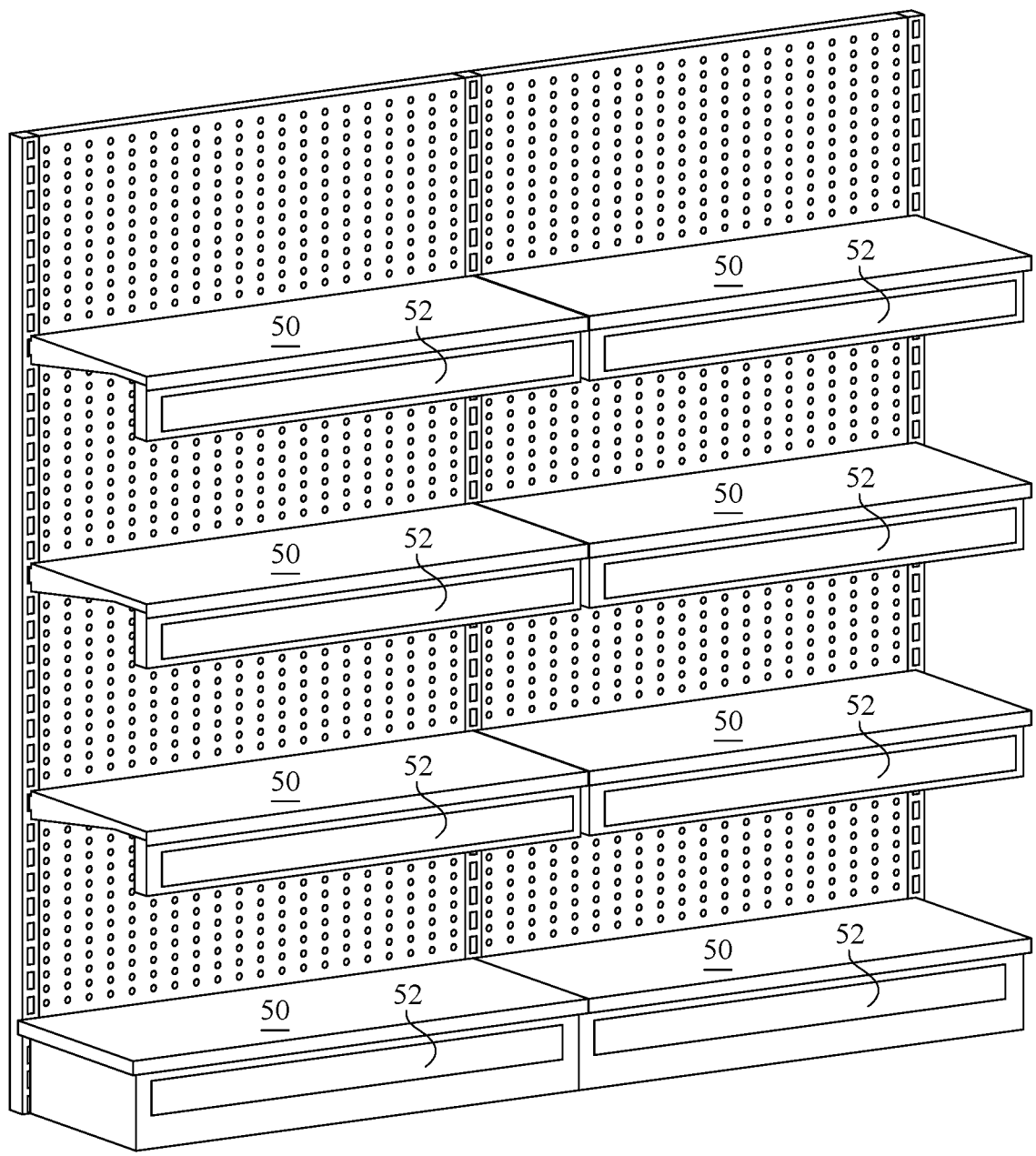
FIG. 2 shows an exemplary electronic shelf module utilized in the system of FIG. 1.
Figure 3:
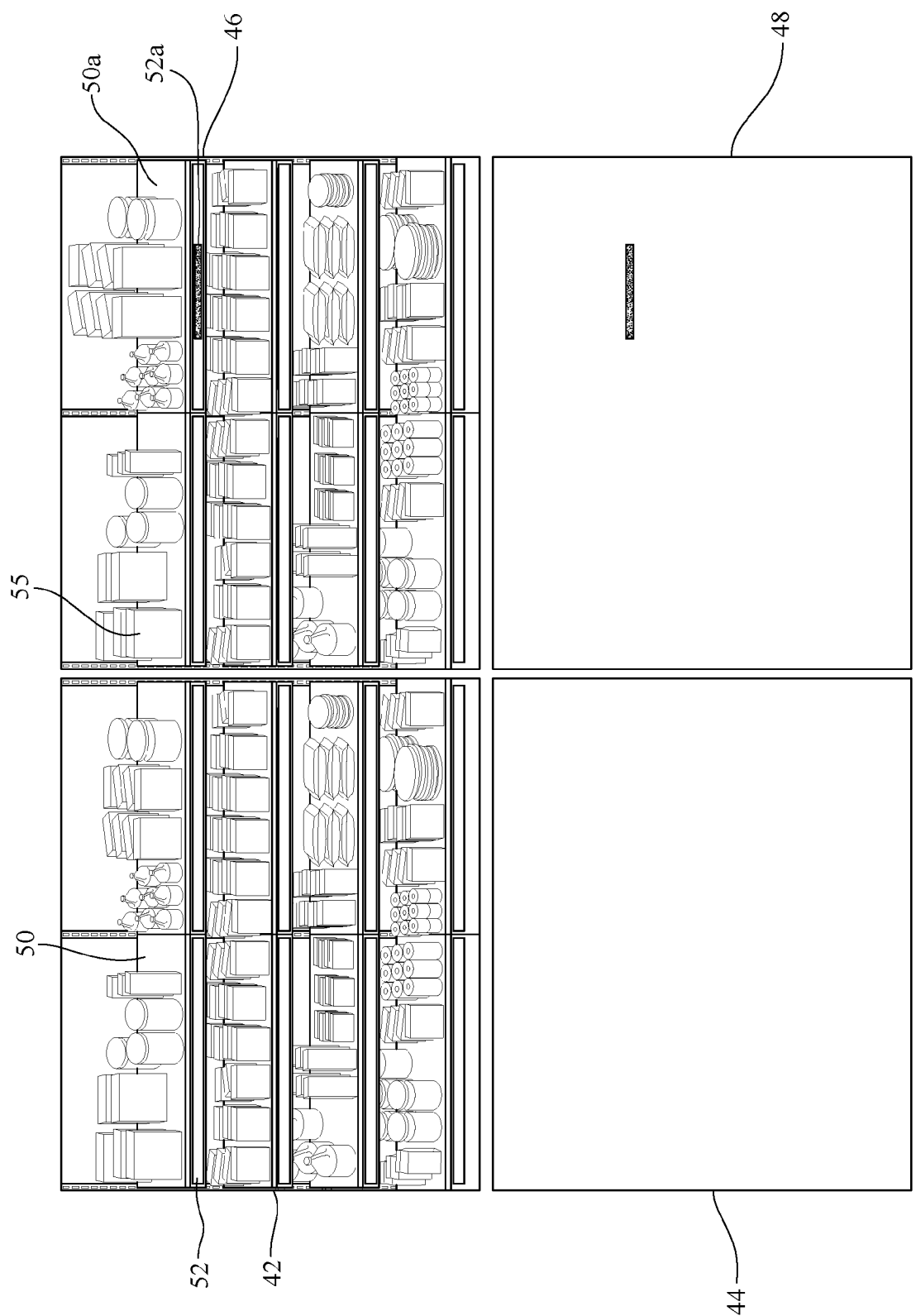
FIG. 3 shows two upper images obtained by a camera within the system of FIG. 1 and two lower images providing a general representations as to how the two upper images may be perceived by the central computer within the system of FIG. 1.

FIG. 2 shows a plurality of electronic shelf modules 50, which may be utilized in the exemplary system 10. FIG. 3 shows a grouping of images, which includes: a first image 42 of electronic shelf modules 50 present within a store at a first time captured by a camera 40; an image 44 providing a general representation as to how the central computer 20 may perceive the first image 42; a second image 46 of the electronic shelf modules 50 captured at a second time by the camera 40; and an image 48 providing a general representation as to how the central computer 20 may perceive the second image 46. As shown in FIGS. 2-3, the electronic shelf modules 50 within the system are typically electronic shelving systems that have display frames 52 configured to display an indicia related to and positioned adjacent to each of the multiple products positioned on the shelf of the electronic shelf module 50. Specifically, in the exemplary shelf modules 50 shown in FIGS. 2-3, the display frame 52 is configured to display indicia onto a transmission-type screen by projecting image data from the rear of the display frame, through the interior of the electronic shelf module 50, and onto the back surface of a transmission-type screen.

Such electronic shelf modules 50 are described, for example, in U.S. Pat. Nos. 9,703,179 and 9,774,134, which are each incorporated herein by reference in their entirety. By using such electronic shelf modules 50, a number of different indicia may be projected onto the display frame 52 including, but not limited to, information about the products (category, type, size, etc.), universal product codes (UPCs), store information, advertisements, and the like. Furthermore, each electronic shelf module 50 is individually addressable and in communication with the central computer 20, such that instructions may be transmitted from the central computer 20 to each electronic shelf module 50 to modify the indicia displayed on the display screen 52.

Figure 4:
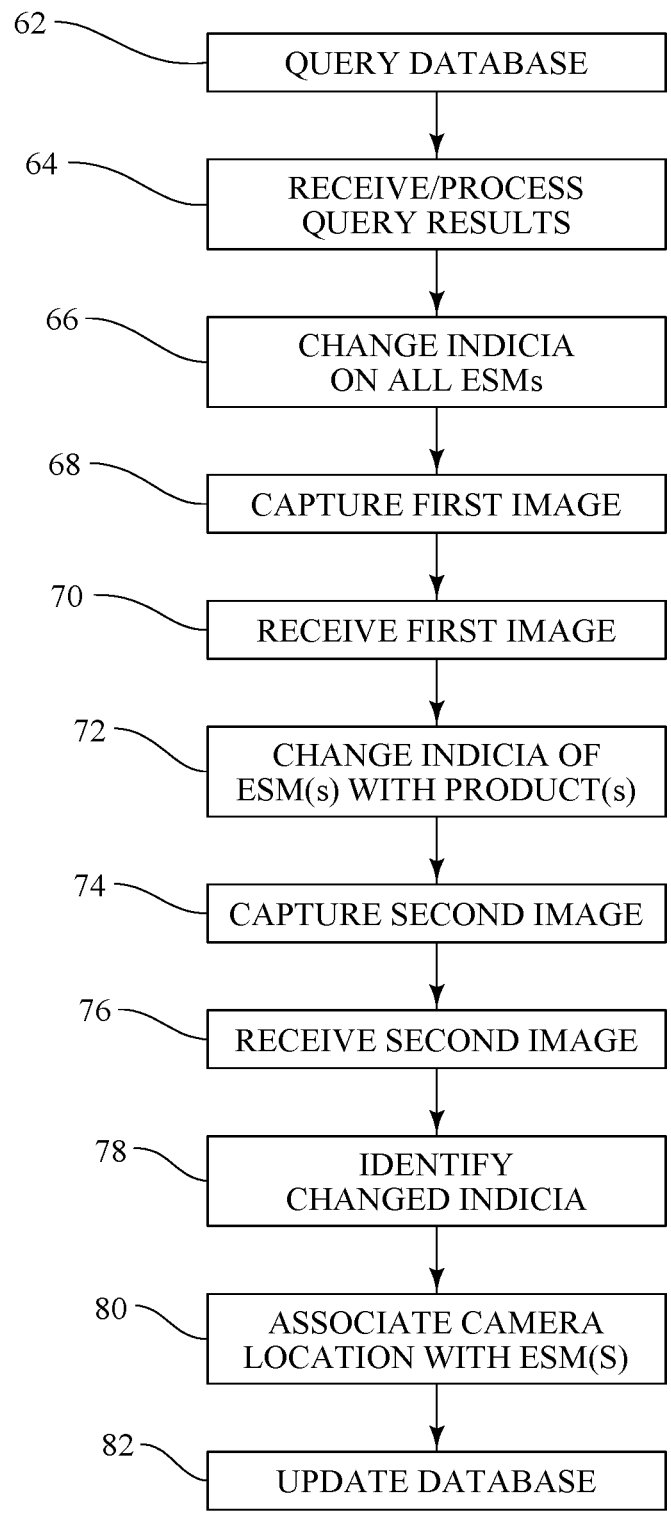
FIG. 4 is a flow diagram of an exemplary method for mapping the location of a product in a store utilizing the system of FIG. 1 in accordance with one implementation of the present invention.

The system 10 includes data stored within the database 30 that identifies on which electronic shelf modules 50 the products 55 are positioned within the store. In this way, the database 30 includes information that links a particular electronic shelf module 50 with one or more products 55 within the store. As such, queries can be initiated on the central computer 20 and subsequently transmitted to the database 30 to ascertain the identity of the electronic shelf modules 50 on which a particular product or group of products is located. Although the identity of the electronic shelf modules 50 on which a particular product 50 is ascertainable based on the foregoing data, the physical location of such electronic shelf modules 50, and thus the particular product 55 positioned thereon, within the store may be nonetheless unknown. Moreover, even if the initial location of the particular shelf modules 50, on which the particular product 55 is located, is known, such electronic shelf modules 50 or the products themselves may be subsequently re-positioned in the store. To ascertain the location of particular electronic shelf modules 50 within the store, the display frame 52 of such electronic shelf modules 50 can be made to display indicia which distinguishes them from the other electronic shelf modules 50 within the store, as described further below with reference to FIG. 4.

Referring again more generally to FIGS. 1-3, communication between the central computer 20, the cameras 40, and the electronic shelf modules 50 is generally facilitated through direct communication between the various devices via a local network. Alternatively, in some embodiments, communications between the central computer 20, the cameras 40, and the electronic shelf modules 50, can also be facilitated through an internet connection, satellite communication, or other similar communications network or known means of data transport, such that the cameras 40 and electronic shelf modules 50 can communicate with the central computer 20 remotely located from the store in which the cameras 40 and electronic shelf modules 50 are located. The database 30 can be stored locally with the central computer 20. Alternatively, the database 30 can be externally stored, such as on a server or cloud database accessible by the central computer 20. With respect to the central computer 20, it will be readily apparent to one of ordinary skill in the art that software running on the central computer 20 causes computer-readable instructions stored in a memory component of the central computer 20 to be executed by a microprocessor of the central computer 20, thereby causing the central computer 20 to perform the various operations described herein. Such computer-readable instructions can be readily coded into computer readable form using standard programming techniques and languages by one of ordinary skill in the art.

Referring now generally to FIGS. 1-4, FIG. 4 is a flow diagram of one exemplary method for mapping a location of a product in a store in accordance with the present invention. In this exemplary method, in step 62, the data of the database 30 is queried by the central computer 20 to identify on which electronic shelf modules 50 within the store a particular product 55 is located. In step 64, based on the query communicated to the database 30, information is transmitted from the database 30 to the central computer 20, which receives and subsequently processes the same. Depending on the nature of the query in step 62, the information received by the central computer 20 may include information pertaining to the identity of the electronic shelf modules 50 corresponding to one or multiple products 55 within the store. For example, in some implementations, the query communicated from the central computer 20 to the database 30 may request the identity of the electronic shelf modules 50 on which a specific product 55 (e.g., 15 oz. CHEERIOS®) is positioned, while, in another implementation, the query may request the identity of the electronic shelf modules 50 on which a general category of products 55 (e.g., cereal) is positioned. In instances of the later, the central computer 20 may, in some implementations, sort, filter, or otherwise further process the information received from the database 30 to ascertain the identity of the electronic shelf modules 50 pertaining on which a particular product 55 within the general category of products 55 is located. In some implementations, the query communicated by the central computer 20 may be such that the central computer 20 receives information corresponding to the identity of the electronic shelf modules on which each product 55 is positioned.

To identify the location of the electronic shelf modules 50 on which the particular product 55 is positioned within the store, in step 66, the central computer 20 transmits instructions to each of the electronic shelf modules 50 that causes the display frame 52 of all the electronic shelf modules 50 to display a similar indicia for each of the multiple products prior to the central computer 20 receiving the first image 42 described below. For example, in some implementations, the electronic shelf modules 50 are placed in a "maintenance" mode in which each electronic shelf module 50 only displays the pricing associated with products 55 positioned on the respective electronic shelf modules 50, rather than, e.g., advertisements positioned adjacent to one subset of products on the shelf module and store information adjacent to another subset of products. In another implementation, the central computer 20 may transmit instructions which cause the display frame 52 of each electronic shelf module 50 to display an indicia in the form of a predetermined color (e.g., a highly visible color), as shown best by the first image 42 in FIG. 3. In alternative implementations, the indicia displayed on the display frames 52 of each of the electronic shelf modules 50 within the store may be similar by default, thereby obviating the need for step 66. Thus, to this extent, step 66 may be optional in some implementations.

Upon displaying a similar indicia on the display frame 52 of each of the electronic shelf modules 50, a camera 40 within the system 10 takes a first image 42 at a first time of one or more of the electronic shelf modules 50 in step 68. In step 70, the central computer 20 communicates with and receives the first image 42 from the camera 40. The camera 40 is generally positioned at a predetermined location in the store such that the camera 40 can obtain images of a selected subset of the electronic shelf modules 50 present within the store, as well as the indicia displayed on the display frames 52 thereof. Accordingly, as shown in FIG. 3, the first image 42 taken by the camera 40 in step 68 and received by the central computer 20 in step 70 shows a selected subset of electronic shelf modules 50, and the corresponding display frames 52 thereof, at a first time when all electronic shelf modules 50 within the store are displaying the similar indicia. Following receipt of the first image 42, in some implementations, the central computer 20 may subsequently process the first image 42 for any discrepancies amongst the indicia displayed on the display frames 52 within the subset of electronic shelf modules 50. For instance, as the display frames 52 of each electronic shelf module 50 within the subset display the similar indicia (e.g., the same predetermined color) within the first image 42 shown in FIG. 3, the central computer 20 will not perceive any discrepancies, as shown in image 44 of FIG. 3.

Once the first image 42 is received by the central computer 20, in step 72, the central computer 20 subsequently transmits instructions to a selected one 50a of the subset of electronic shelf modules 50 to change the indicia on the display frame 52a on only the selected one 50a of the subset of electronic shelf modules 50, as shown best in the second image 46 of FIG. 3. The foregoing step is executed prior to the central computer 20 receiving the second image 46 described below. The selected one 50a of the subset of electronic modules 50 is selected based on the query result information received by the central computer 20 in step 64. As such, the selected one 50a of the subset of electronic modules 50 is known to be associated with a particular product 55 within the store. To distinguish the display frame 52a of the selected one 50a of the subset of electronic shelf modules 50, the central computer 52 may transmit instructions that causes the indicia displayed on the display frame 52a of the selected one 50a of the subset of electronic shelf modules 50 to change to a color that is different from the indicia on the other electronic shelf modules 50 within the subset. As such, in some implementations, the color displayed on the display frame 52a of the selected one 50a of the subset of electronic modules 50 will be different from the color displayed thereon at the first time when the first image 42 was captured. In some implementations, the instructions transmitted from the central computer 20 may cause the indicia displayed on the display frame 52a of the selected one 50a of the subset of electronic shelf modules 50 to change for a predetermined period of time. As shown best in FIG. 3, the display frame 52 on an electronic shelf module 50 may be configured to display indicia corresponding to multiple, different products 55 that are positioned on the same shelf. Accordingly, to change the indicia only on the portion the display frame 52a of the selected one 50a of the subset of electronic shelf modules 50 corresponding to the particular product 55, in some implementations, the instructions transmitted from the central computer 20 may cause only a portion of the display frame 52a of the selected one 50a to change indicia, as further shown in FIG. 3.

One of skill in the art will readily appreciate that changing the color of the indicia is but one of many ways in which the selected one 50a of the electronic shelf modules 50 may be distinguished from the other electronic shelf modules 50 within the subset, and that the indicia of the selected one 50a may be changed in alternative manners while still enabling the above-described system 10 and presently-described method to function for their intended purpose. For example, in some implementations, the central computer 20 may transmit instructions to the selected one 50a of the subset of electronic shelf modules 50 that causes the display frame 52a of the selected one 50a to display a different pattern than that of the other display frames 50 within the subset of electronic shelf modules 50.

After changing the indicia on the display frame 52a of the selected one 50a of the subset of electronic shelf modules, in step 74, the camera 40 captures a second image 46 at a second time of the subset of electronic shelf modules 50, which shows the changed indicia on the display frame 52a of the selected one 50a of the subset of electronic shelf modules 50, as shown in FIG. 3. In step 76, the central computer 20 communicates with and receives the second image 46 from the camera 40. Following receipt of the second image 46, in some implementations, the central computer 20 may subsequently process the second image 46 for any discrepancies amongst the indicia displayed on the display frames 52 within the subset of electronic shelf modules 50. As the display frames 52a of the selected one 50a of the subset of electronic shelf modules 50a in the second image 46 shown in FIG. 3 differs from the display frames 52 of the other electronic shelf modules 50 within the subset (e.g., the display frame 52a of the selected one 50a is of a different color) at the second time, the central computer 20 will perceive a discrepancy within the second image 46, as shown by image 48 in FIG. 3.

Following receipt of the second image 46, in step 74, the central computer 20 compares the first image 42, which shows the subset of electronic shelf modules 50 at a first time displaying the similar indicia, to the second image 46, which shows the changed indicia on the display frame 52a of the selected one 50a of the subset of electronic shelf modules 50 to identify any presence of changed indicia between the first and second images 42, 46. In some implementations, the central computer 20 may identify changed indicia by comparing any perceived discrepancies amongst the display frames 52 in the second image 46 (the stippled box in image 48 of FIG. 3) to any perceived discrepancies amongst the display frames 52 in the first image 42 (none). Detection of changed indicia between the first image 42 and the second image 46 signifies that the electronic shelf modules 50 on which the particular product 55 is positioned has successfully been located in the store. In turn, because the camera 40 having obtained the first and second images 42, 46 of the subset of electronic modules 50 is in a predetermined location within the store, the location of the electronic shelf modules 50 on which the particular product 55 is positioned can thus be ascertained based on the known location of the camera 40. Accordingly, in step 80, the central computer 20 associates the known location of the camera 50 with the selected one 50a of the electronic modules 50, which, based on the query results obtained from the database 30, is known to be associated with the particular 55. Thus, because of the association of a particular product to particular electronic shelf modules 50, the location of the particular product is identified by the central computer 20 based on the identified location of the selected one 50a of the electronic shelf modules 50. In step 82, the central computer 20 then updates the database 30 with the location of the particular product 55 by transmitting instructions to the database 30, which causes the database 30 to associate the identified location of the electronic shelf module 50 on which the particular product is located with the particular product 55.

Although the exemplary system 10 and method described above with reference to FIGS. 1-4 is described with general reference to identifying the location of a particular product out of multiple products present in the store, it is of course contemplated that the system 10 and method described above can also be utilized to identify the location of multiple products within the store. For instance, in some implementations, the above-described method may be used to identify the position of a category of products (e.g., cereal products)

within a store. Accordingly, queries may be initiated on the central computer 20 which cause the central computer 20 to receive information from the database 30 regarding the identity of each electronic shelf module 50 corresponding to a category products in the store. Moreover, the central computer 20 may transmit instructions to change indicia for each of the electronic shelf modules 50 on which products corresponding to the particular category of products is positioned. Further, by making use of the systems and methods described herein, it is contemplated that systems and methods can be implemented for each product or each category of products in a particular store to automatically identify the location of each product or category of product in a store at regular time intervals.

Figure 5:
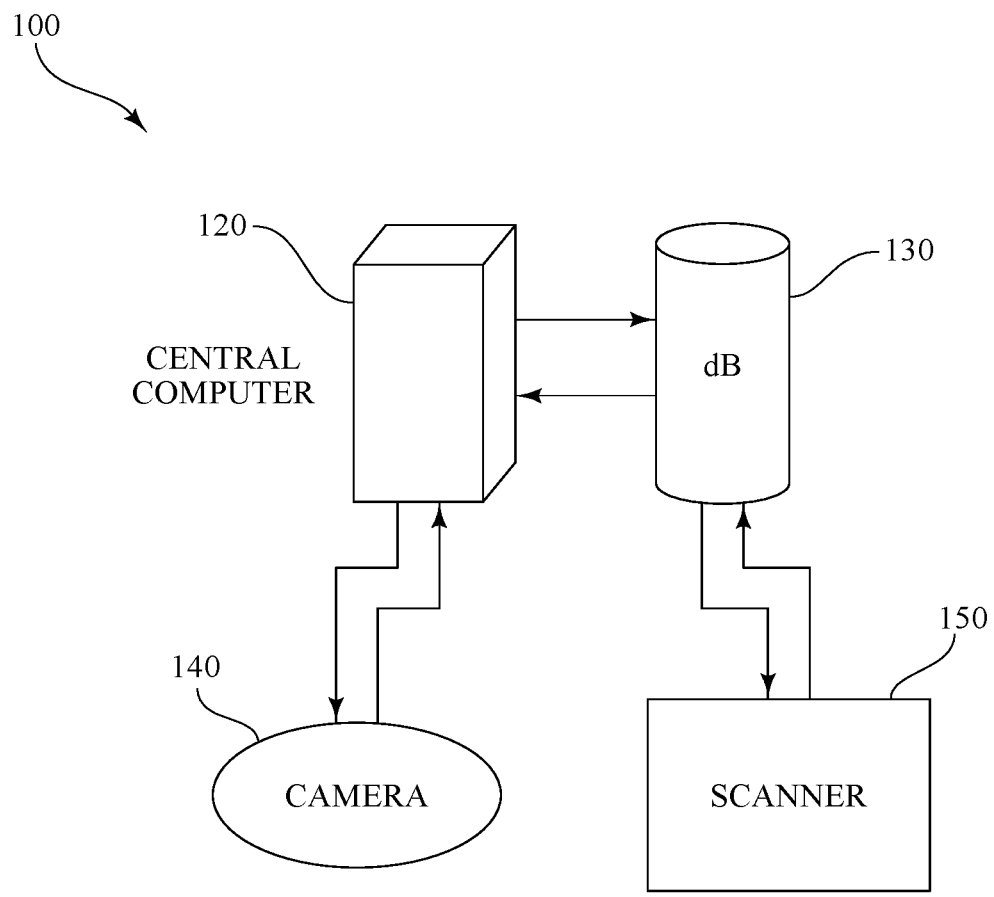
FIG. 5 is a schematic diagram of another exemplary system for mapping the location of a product in a store in accordance with one embodiment of the present invention.
Figure 6A:
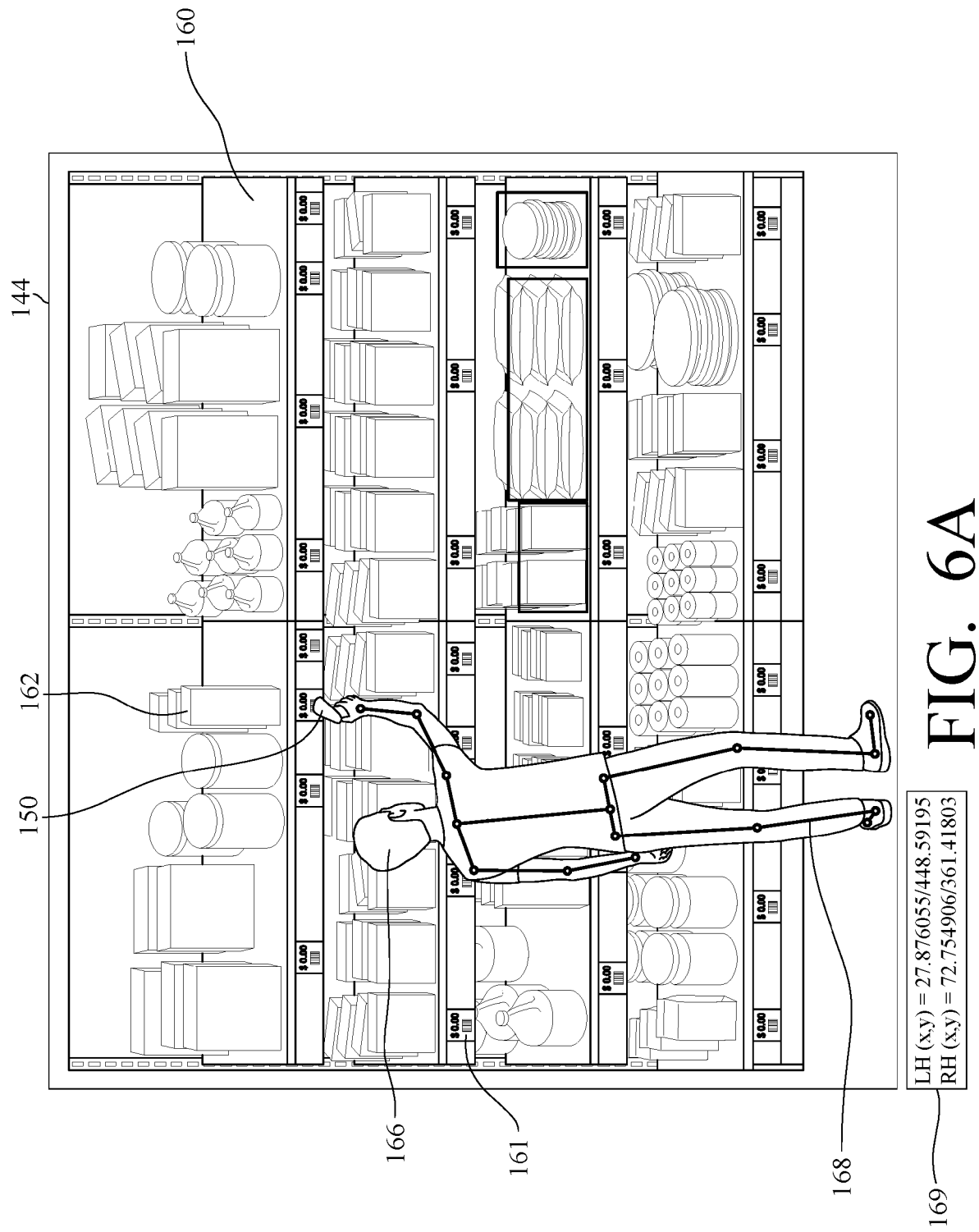
FIG. 6A is an image obtained and modified by the system of FIG. 5.
Figure 6B:
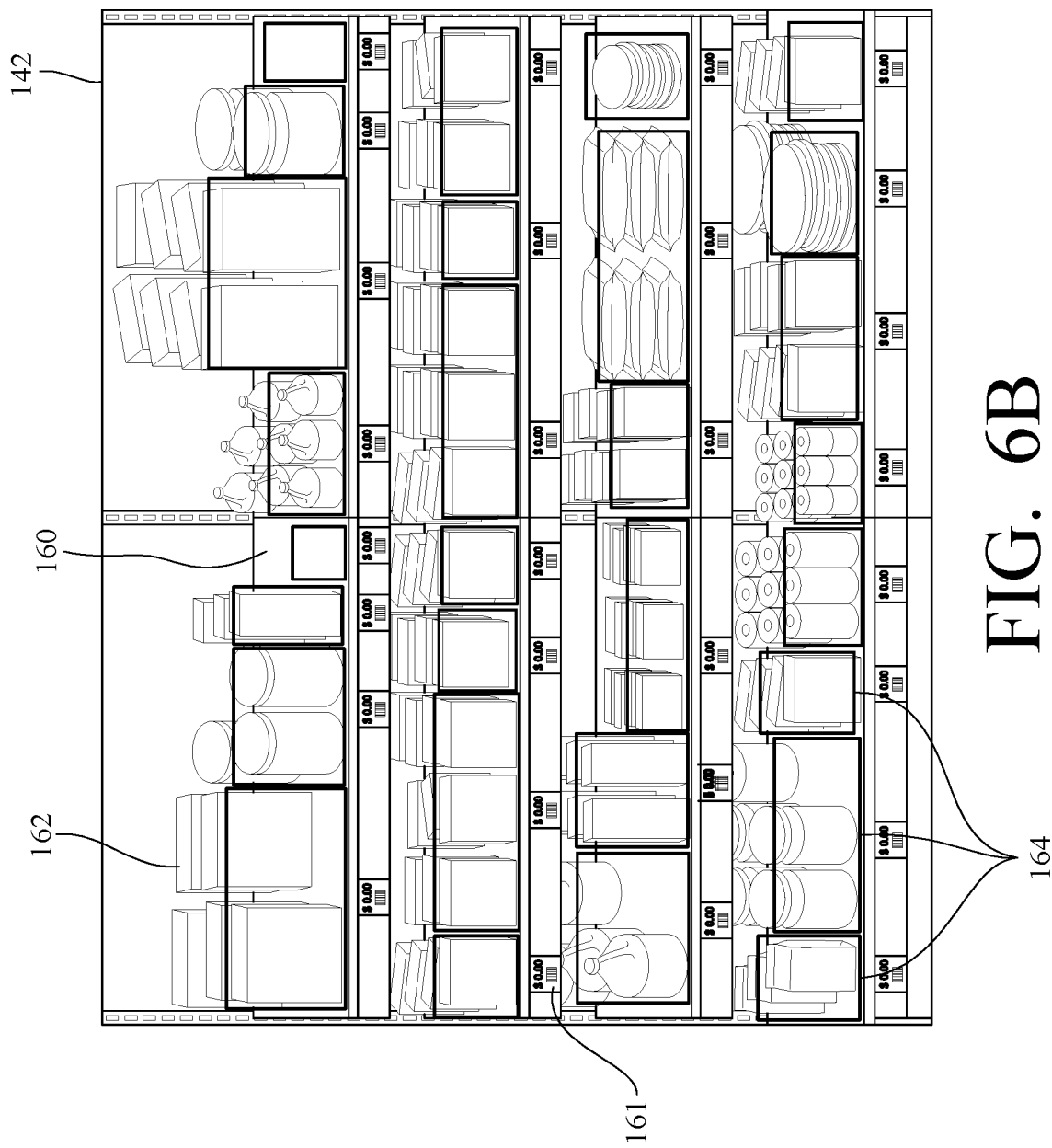
FIG. 6B is an image obtained and modified by the system of FIG. 5.

Referring now to FIGS. 5 and 6A-6B, in another exemplary embodiment of a system for mapping a location of a product in a store, such as a grocery store, a system 100 is provided that comprises a central computer 120, one or more cameras 140 configured to capture images within the field of view of the one or more cameras 140, a scanner 150 configured to scan indicia 161 related to a product, and one or more shelves 160 on which the products 162 within the store may be positioned. In some embodiments, the system 100 may further comprise a database 130 configured to store data about or related to the various products 162 within the store.

Unlike the system 10 shown in FIGS. 1-3, the system 100 shown in FIGS. 5 and 6A-6B does not require the use of electronic shelf modules. Rather, the one or more shelves 160 may comprise any shelving suitable for supporting multiple products 162 and displaying indicia 161 corresponding to such products 162 consistent with the manner described herein. As shown in FIGS. 6A-6B, each shelf 160 includes one or more indicia 161. Each individual indicia 161 is related to and is positioned adjacent to a respective product 162 of the multiple products 162 present on the shelving 160. Preferably, each indicia 161 includes markings or information which pertain to the identity of a specific product 162 and are capable of being scanned by the scanner 150. To this end, in some embodiments, each indicia may comprise a uniform product code (UPC), which includes information corresponding to the identity of a product 162.

Data which may be stored within the database 130 similarly includes, but is not limited to, data about the categories of products 162 present in the store (e.g., boxed cereal, canned vegetables, flour, detergent, etc.), data about the general types of products 162 present in the store (e.g., CHEERIOS® cereal or TIDE® detergent), data about the specific types of products 162 present in the store (e.g., 15 oz. CHEERIOS® or 128 oz. Tide® with fabric softener), and/or data related to the UPCs corresponding to the products 162. The database 130 is in communication with the central computer 120, such that a query of the data about the products 162 present in the store can be initiated from the central computer 120 and sent to the database 130 from central computer 20. Information matching the query can then be received by the central computer 120 from the database 130 for further processing and analysis. In some embodiments, instructions to add, update, or otherwise modify data may also be initialized from the central computer 120 and sent to the database 130 from the central computer 120 to effectuate changes within the database 130.

The central computer 120 is also in communication with the one or more cameras 140, such that images captured by the one or more cameras 140 can be transmitted to the central computer 120 for subsequent processing, as further described below. The one or more cameras 140 are typically mounted in predetermined locations around the store, with each camera 140 positioned to obtain images of at least one shelf 160 and the corresponding indicia 161 included thereon. The location of each camera 140 within the store may be stored locally on the central computer 120, stored within the database 130, and/or embedded as metadata within the images captured by the cameras 140. As the system 100 may be employed in various store and shelving arrangements, the number of cameras 140 utilized within the system 100 may vary. Preferably, the number and positioning of the cameras 140 is such that images of each shelf 160, and the indicia 161 and products 162 thereon, can be captured by at least one camera 140 within the system 100. The cameras 140 utilized in accordance with the system 100 can be any camera of sufficient resolution to provide a general image of the indicia 161 and products 162 present on a shelf 160 in the store, and thus are not particularly limited to any specific type of camera. For instance, in one embodiment, the cameras 140 within the system 100 may comprise surveillance cameras within the store.

As noted above, the scanner 150 within the system 100 is configured to scan the indicia 161 related to and positioned adjacent to a particular product 161 positioned on a shelf 160, and thus may be any device suitable for doing the same. Accordingly, in some embodiments, the scanner 150 may comprise a device specifically designed to scan indicia 161 corresponding to the various products 162 within the store, such as a scanner gun commonly utilized in grocery stores, as shown in FIG. 6A. In other embodiments, the scanner 150 may comprise a general purpose device, such as a smartphone with a UPC scanning application installed thereon. The central computer 120 is also in communication with the scanner 150, such that the scanner 150 can transmit scanned information to the central computer 120 corresponding to to the identity of a specific product 162 after scanning the indicia 161 corresponding to such product 162.

Referring again to FIG. 5, communication between the central computer 120, the cameras 140, and the scanner 150 within the system 100 is generally facilitated through direct communication between the various devices via a local network. Alternatively, in some embodiments, communications between the central computer 120, the cameras 140, and the scanner 150, can also be facilitated through an internet connection, satellite communication, or other similar communications network or known means of data transport, such that the cameras 140 and scanner 150 can communicate with the central computer 20 remotely located from the store in which the cameras 140 and the scanner 150 are located. The database 130 can be stored locally with the central computer 120. Alternatively, the database 130 can be externally stored, such as on a server or cloud database accessible by the central computer 120. With respect to the central computer 120, it will be readily apparent to one of ordinary skill in the art that software running on the central computer 120 causes computer-readable instructions stored in a memory component of the central computer 120 to be executed by a microprocessor of the central computer 120, thereby causing the central computer 120 to perform the various operations described herein. Such computer-readable instructions can be readily coded into computer readable form using standard programming techniques and languages by one of ordinary skill in the art.

Figure 7:
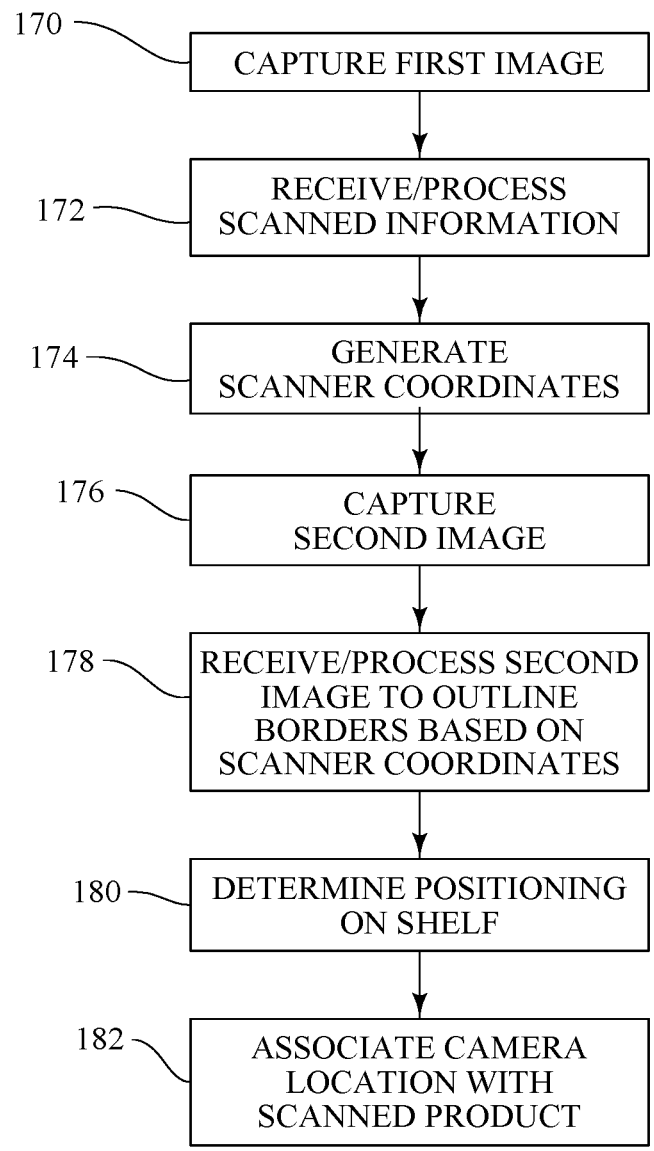
FIG. 7 is a flow diagram of an exemplary method for mapping the location of a product in a store utilizing the system of FIG. 5 in accordance with one implementation of the present invention.

FIG. 7 is a flow diagram of another exemplary method for mapping a location of a product in a store in accordance with the present invention. In this implementation, the method commences, in step 170, by a camera 140 within the system 100 capturing a first image 144 of the products 162 positioned on the shelves 160 at a first time when each product 162 is visible to the camera 140 and when an individual 166 is scanning an indicia 161 of a particular product 162 with a scanner 150, as shown in FIG. 6A. Scanned information corresponding to the identity of the scanned product 162 is then communicated from the scanner 150 to the central computer 120, which processes the same to identify the particular product 162 in step 172. As shown best in FIG. 6A, during processing of the first image 144, the central computer 120 uses skeletal-tracking software to identify the skeletal positioning 168 of the individual 166 at the first time to which the first image 144 corresponds. In some implementations, the skeletal-tracking software used to track the skeletal positioning 168 of the individual 166 may include pose skeletal-tracking software, such as WrenchAI, OpenPose, or TensorFlow Posenet. In some instances, the skeletal-tracking software may be customized for a particular application as desired using coding language such as C, Python, Java, and/or other languages as would be apparent to those skilled in the art.

Based on the skeletal positioning 168 of the individual 166 scanning the particular product 162 and/or associated indicia, the central computer 120 generates coordinates 169, which correspond to the positioning of the scanner 150 within the first image 144 in step 174. As shown in FIG. 6A, the central computer 120 generates coordinates which correspond to the positioning of various body parts of the individual 168 within the first image 144 (e.g., the left foot, right foot, left hand of the individual 166). Using the coordinates of the hand in which the scanner 150 is held by the individual 166 in the first image 144, the positioning of the scanner 150 is thus obtained. For instance, in the first image 144 shown in FIG. 6A, the scanner 150 is in the right hand of the individual 166, such that the central computer 120 may associate the coordinates 169 corresponding to the right hand of the individual 166 with the position of the scanner 150 at the first time to which the first image 144 corresponds. In other implementations, the central computer 150 may track the positioning of the scanner 150 within the first image 144 directly, i.e., without using the skeletal position 168 of the individual 166. As the identity of the scanned product 162 is known based on the scanned information transmitted from the scanner 150, the central computer 150 associates the identity of the particular product with the coordinates generated in step 174.

Once the first image 142 is processed by the central computer 120, including the generation of the scanner coordinates, the camera 140 then takes a second image 142 of the products 162 positioned on the shelves 160 at a second time, but without the individual present. The central computer 120 then receives that second image and begins processing that image in step 182. In processing the second image 142, the central computer 120 aligns the coordinates obtained with the use of the scanner with the image of the products 162 to outline a border 164 around the respective products 162 positioned at those coordinates. As further shown in FIG. 6B, in this implementation, the central computer 120 outlines a single border for products 162 of the same type that are horizontally adjacent to one another. Further, in this implementation, the central computer 120 also outlines a border for instances where an indicia 161 is present, but the product 162 corresponding to such indicia 161 is absent from the shelving 160. Each border 164 corresponds to a particular position on the shelving 160. One of skill in the art will recognize, however, that the central computer 120 may be programmed to outline the products 162 within the second image 142 in an alternative manner while still enabling the above-described system 100 and present method to function for its intended purpose and without changing the principle of operation thereof. For instance, in some implementations, the central computer 20 may be configured to provide horizontally adjacent products 162 of the same type with individual borders 164. In some implementations, the central computer 120 may provide a reference number for each border 164.

To outline the products 162 in the above-described manner, in some implementations, the central computer 120 may be equipped with image recognition software, which, when executed by the central computer, enables the central computer to detect the presence of individual products. In some instances, the image recognition software code may be customized for the presently-described method using coding language such as C, Python, Java, and/or other languages as would be apparent to those skilled in the art.

As each border 164 corresponds to a particular position on the shelving 160, the central computer 120 can effectively determine in step 180 the location of the scanned product 162 on the shelving 160 based on the particular position of the respective border 164 to which the coordinates of the scanner 150 align. In turn, because the camera 140 having obtained the first and second images 142, 144 is in a predetermined location within the store, the location of the shelving 160 on which the scanned product 162 is positioned can thus be ascertained based on the known location of the of the camera 140. Accordingly, in step 182, the central computer 120 associates the known location of the camera 140 with the shelving 160 on which the scanned product 162 is positioned. In this way, both the location of the shelf 160 on which a particular product 162 is located as well as the specific positioning of the product 162 on such shelf 160 is obtained through execution of the foregoing method. In some implementations, the central computer 120 may then update the database 130 with the location of the particular shelf 160 on which a particular product 162 is located within the store and with the positioning of the product 162 on such shelf 160 by transmitting instructions to the database 130.

One of ordinary skill in the art will recognize that additional embodiments and implementations are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A method for mapping a location of a product in a store, comprising:

receiving, at a central computer, information from a database storing data about multiple products present in the store in response to a query initiated from the central computer about a particular product of the multiple products, each product of the multiple products being positioned on an electronic shelf module of a plurality of electronic shelf modules present in the store, and each electronic shelf module including a display frame that is configured to display indicia and is positioned adjacent to each of the multiple products;

receiving, at the central computer, a first image at a first time from a camera positioned at a predetermined location in the store, the first image showing a selected subset of the plurality of electronic shelf modules and showing the indicia displayed by the display frame of each electronic shelf module of the selected subset;

selecting, via the central computer, a selected one of the subset of electronic shelf modules based on the information received at the central computer from the database in response to the query;

changing, at the selected one of the subset of electronic shelf modules, the indicia displayed by the display frame of the selected one of the subset of electronic shelf modules from a first indicia displayed by the display frame of the selected one of the subset of electronic shelf modules in the first image to a second indicia that is different than the first indicia in response to instructions received from the central computer;

receiving, at the central computer, a second image at a second time from the camera, the second image showing the second indicia displayed by the display frame of the selected one of the subset of electronic shelf modules;

identifying, via the central computer, a change of indicia displayed on the display frame of the selected one of the subset of electronic shelf modules from the first indicia to the second indicia based on the first image and the second image;

identifying, via the central computer, a location of the selected one of the subset of electronic shelf modules within the store based on the change of indicia displayed on the display frame of the selected one of the subset of electronic shelf modules from the first indicia to the second indicia and the predetermined location of the camera;

generating, using skeletal tracking software, a plurality of coordinates associated with various body parts of an individual with a scanner;

identifying, via the central computer, a location of the particular product within the store based on the identified location of the selected one of the subset of electronic shelf modules and further based on an alignment of the plurality of coordinates; and updating the database with the identified location of the particular product;

wherein the location of the selected one of the subset of electronic shelf modules and the location of the particular product within the store is unknown at the time query is initiated by the central computer.

2. The method of claim 1, further comprising a step of updating the database with the identified location of the selected one of the subset of electronic shelf modules.

3. The method of claim 1, further comprising a step of transmitting, via the central computer, instructions to the plurality of electronic shelf modules to display a similar indicia for each of the multiple products prior to receiving the first image.

4. The method of claim 1, wherein changing the indicia displayed by the display frame of the selected one of the subset of electronic shelf modules comprises changing the indicia displayed by the display frame of each electronic shelf module of the subset of electronic shelf modules associated with a particular category of products.

5. The method of claim 1, wherein changing the indicia displayed by the display frame of the selected one of the subset of electronic shelf modules comprises changing the indicia displayed by the display frame of each electronic shelf module of the subset of electronic shelf modules associated with a particular one of the multiple products.

6. The method of claim 1, wherein changing the indicia displayed by the display frame of the selected one of the electronic shelf modules from the first indicia to the second indicia comprises changing the indicia displayed by the display frame of the selected one of the subset of electronic shelf modules to a predetermined color for a period of time.

7. The method of claim 6, wherein the first indicia corresponds to a first color and the second indicia corresponds to a second color that is different from the first color.

8. The method of claim 1, wherein receiving information from the database comprises receiving information corresponding to an identity of the electronic shelf module on which each product is positioned.

9. The method of claim 1, wherein the information received at the central computer from the database includes an identity of the electronic shelf module on which a particular one of the multiple products is positioned.

10. The method of claim 1, wherein the display frame of the selected one of the subset of electronic shelf modules is configured to display the first indicia and the second indicia onto a transmission-type screen by projecting image data from the rear of the display frame, through the interior of the electronic shelf module, and onto the back surface of the transmission-type screen.

11. A system for mapping a location of a product in a store, comprising:

a central computer;

an electronic shelf module in communication with the central computer, the electronic shelf module supporting the product, and the electronic shelf module including a display frame that is configured to display indicia and is positioned adjacent to the product;

a database in communication with the central computer, the database configured to store data about the product; and one or more cameras in communication with the central computer, the one or more cameras being positioned at a predetermined location in the store to obtain images showing the electronic shelf module and the indicia displayed on the display frame;

wherein information from the database is received at the central computer in response to a query of the data about the product initiated from the central computer;

wherein the central computer is configured to selectively transmit instructions to the electronic shelf module based on the information received from the database in response to the query, the transmitted instructions, when received at the electronic shelf module, changing the indicia displayed on the display frame of the electronic shelf module from a first indicia to a second indicia that is different than the first indicia;

wherein images of the display frame obtained from the one or more cameras before the indicia displayed by the display frame is changed from the first indicia to the second indicia and after the indicia displayed by the display frame is changed from the first indicia to the second indicia are processed on the central computer to identify a change of indicia displayed on the display frame from the first indicia to the second indicia;

wherein the location of the electronic shelf module in the store is identified by the central computer based on the change of indicia displayed on the display frame from the first indicia to the second indicia and the predetermined location of the one or more cameras;

wherein the central computer, using skeletal tracking software, generates a plurality of coordinates associated with various parts of an individual with a scanner;

wherein a location of the product within the store is identified by the central computer based on the identified location of the electronic shelf module and further based on an alignment of the plurality of coordinates;

wherein the database is updated with the location of the product subsequent to the location of the product being identified by the central computer; and wherein the location of the electronic shelf module and the product within the store are unknown at the time the query is initiated by the central computer.

12. The system of claim 11, wherein the electronic shelf module is one of a plurality of electronic shelf modules located in the store, and wherein the database stores data about the positioning of the product on the electronic shelf module.

13. The system of claim 12, wherein the first indicia corresponds to a first predetermined color and the second indicia corresponds to a second predetermined color, and wherein the transmitted instructions, when received at the electronic shelf module, change the indicia displayed on the display frame to the second indicia for a predetermined period of time.

14. The system of claim 11, wherein the central computer is further configured to update the database with the identified location of the electronic shelf module within the store.

15. The system of claim 11, wherein the display frame of the electronic shelf module is configured to display the first indicia and the second indicia onto a transmission-type screen by projecting image data from the rear of the display frame, through the interior of the electronic shelf module, and onto the back surface of the transmission-type screen.

* * * * *